US 8,528,680 B2

(12) United States Patent
Florus et al.

(10) Patent No.: US 8,528,680 B2
(45) Date of Patent: Sep. 10, 2013

(54) METHOD OF CONSTRUCTING A MODULAR VEHICLE

(71) Applicant: The Boeing Company, Chicago, IL (US)

(72) Inventors: Howard C. Florus, Madison, AL (US); David E. Hall, Madison, AL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 13/730,955

(22) Filed: Dec. 29, 2012

(65) Prior Publication Data

US 2013/0118000 A1 May 16, 2013

Related U.S. Application Data

(62) Division of application No. 12/563,642, filed on Sep. 21, 2009, now Pat. No. 8,342,279.

(51) Int. Cl.
*B60R 16/04* (2006.01)

(52) U.S. Cl.
USPC ......................................................... 180/68.5

(58) Field of Classification Search
USPC ............ 180/68.2, 68.5, 65.235, 65.21, 65.22, 180/165; 903/907
See application file for complete search history.

(56) References Cited

U.S. PATENT DOCUMENTS

| | | | |
|---|---|---|---|
| 3,766,399 A | 10/1973 | Demetrescu | |
| 4,027,485 A | 6/1977 | Wallis | |
| 4,144,864 A * | 3/1979 | Kato et al. | 123/198 F |
| 4,541,387 A | 9/1985 | Morikawa | |
| 5,678,646 A * | 10/1997 | Fliege | 180/65.1 |
| 6,154,381 A | 11/2000 | Kajouke et al. | |
| 6,349,683 B1 * | 2/2002 | Annen et al. | 123/46 E |
| 6,885,920 B2 * | 4/2005 | Yakes et al. | 701/22 |
| 7,338,335 B1 * | 3/2008 | Messano | 180/65.22 |
| 2008/0245587 A1 * | 10/2008 | Sastry et al. | 180/65.2 |
| 2011/0189527 A1 | 8/2011 | Michelitsch et al. | |

OTHER PUBLICATIONS

Indy Power Systems, *Multi-Flex™ Energy Management—Hybrid and Electric Vehicles*, http://www.indypowersystems.com/products/hybrid-and-electric-vehicles.html (visited Sep. 21, 2009).

* cited by examiner

*Primary Examiner* — John Walters
*Assistant Examiner* — James Triggs
(74) *Attorney, Agent, or Firm* — Alston & Bird LLP

(57) ABSTRACT

A method of constructing a modular vehicle is provided. A modular vehicle includes a chassis and a plurality of docking fixtures carried by the chassis. The docking fixtures may include an electrical power connection, a fluid connection and a data communication connection. The modular vehicle may also include a plurality of modules removably connected to respective ones of the docking fixtures. The plurality of modules may include at least an energy supply module, such as a fuel cell, an energy storage module and a cooling module. At least one module may include an electrical power connection coupled to the electrical power connection of a docking fixture, at least one module may include a fluid connection coupled to the fluid connection of a docking fixture and at least one module may include a data communication connection coupled to the data communication connection of a docking fixture.

19 Claims, 10 Drawing Sheets

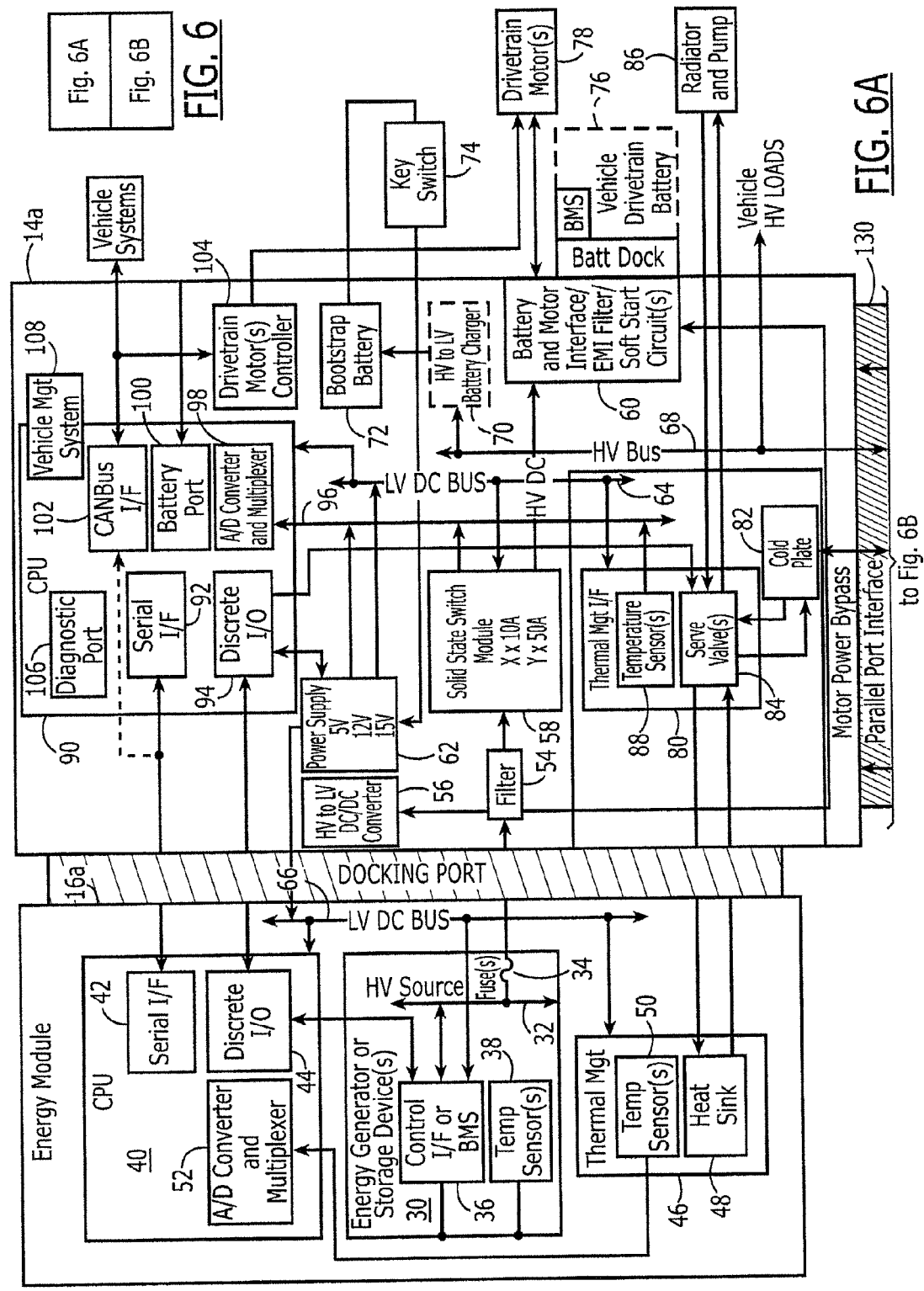

METHOD OF CONSTRUCTING A MODULAR VEHICLE

CROSS-REFERENCE TO RELATED APPLICATION

This application is a divisional of application Ser. No. 12/563,642, filed on Sep. 21, 2009, which is hereby incorporated herein in its entirety by reference.

TECHNOLOGICAL FIELD

Embodiments of the present disclosure relate generally to vehicles and, more particularly, to vehicles constructed in a modular fashion.

BACKGROUND

Although there are several different categories of vehicles, such as wheeled vehicles, tracked vehicles, marine vehicles and the like, within each category, there are generally large numbers of vehicles that are identical or nearly identical from a performance and operational standpoint. While the production of large numbers of identical or nearly identical vehicles may offer some advantages, the reliance upon large numbers of nearly identical vehicles also brings about a number of inefficiencies. In this regard, nearly identical vehicles may be deployed in a number of different situations with each situation demanding different operational characteristics from the vehicle. Since the nearly identical vehicles are not particularly adapted to the situations the vehicles are to be deployed, the operational characteristics of the vehicles may be somewhat mismatched to the requirements of the different deployment scenarios, thereby leading to inefficiencies.

For example, a military vehicle deployed to patrol the streets of a city and a military vehicle deployed to tow a radar unit would be called upon to perform in different manners. In this regard, the vehicle that is deployed to tow a radar unit would be expected to have an engine that is sized and a transmission that is geared in an appropriate manner to provide the power required to tow the radar unit. In addition, the vehicle configured to tow the radar unit may also be expected to act as a power source for the radar unit once the radar unit is deployed and operational. However, if the vehicles that are deployed in the different situations are identical or nearly identical, one design approach may be to design the vehicles to satisfy the most rigorous demands placed upon the vehicles from among all of the various situations in which the vehicles may be deployed. While a vehicle that is designed in such a fashion would be expected to satisfy the operational requirements of the various deployment scenarios, a number of the vehicles that are deployed in some of the less demanding situations would, in effect, have additional and unused capacities or features, thereby resulting in an inefficient design. Alternatively, the vehicles may be designed to have operational characteristics that attempt to strike a balance, or, in other words, satisfy the median requirement for the various situations in which the vehicles will be deployed. While vehicles designed in this fashion will likely not have as many unused resources, the vehicles also may not be able to fully satisfy the operational characteristics demanded by some of the more rigorous situations in which the vehicles will be deployed.

Vehicles, such as wheeled or tracked vehicles as well as at least some marine vehicles, are generally constructed by initially selecting the engine and the transmission, such as by selecting a particular size of engine and specific operational parameters for the transmission. The remainder of the vehicle may then be assembled around the engine and transmission. As such, the design of a vehicle may not be readily scaled so as to provide a similar vehicle of a different size. Instead, a different engine and transmission may need to be selected to satisfy requirements of the differently-sized vehicle with the remainder of the differently-sized vehicle then again being constructed about the selected engine and transmission.

Additionally, current vehicular design generally utilizes a number of unique interfaces between the various components with the interfaces sometimes differing from one type of vehicle to another type of vehicle. As such, it may be more difficult than desired to reuse or swap components between different types of vehicles. Further, a vehicle designed about a particular engine and transmission may not be readily altered or upgraded to accept a different engine, such as an engine constructed based upon improved technology. Similarly, the design of vehicles about a particular engine and transmission may also limit the adaptability of the vehicles to the demands of the particular situations in which the vehicles are expected to be deployed.

It may therefore be desirable to provide an improved technique for the construction of vehicles. For example, it may be desirable to provide an improved technique for the construction of vehicles that are more customized and may therefore by adapted to the demands expected to be placed upon the vehicle once deployed.

BRIEF SUMMARY

A method of constructing a modular vehicle is provided according to embodiments of the present disclosure. By constructing the vehicle in a modular fashion, the vehicle can be more readily adapted to the demands that are anticipated to be placed upon the vehicle following deployment. Additionally, the modular construction of the vehicle according to embodiments of the present disclosure may facilitate the scalability of the vehicles by providing a more efficient mechanism for constructing a vehicle of a different size. Further, the construction of a vehicle according to a modular concept in accordance with embodiments of the present disclosure may facilitate the maintainability of the vehicle by permitting modules to be more readily replaced or swapped and may facilitate the subsequent insertion of different or additional modules that may include improvements that have been introduced since the initial construction of the vehicle.

In one embodiment, a method of constructing a modular vehicle is provided that includes providing a chassis that carries a plurality of docking fixtures. At least one of the docking fixtures includes an electrical power connection, at least one of the fixtures includes a fluid connection and at least one of the fixtures includes a data communication connection. The method of this embodiment also includes removably connecting a plurality of modules to respective ones of the docking fixtures. The plurality of modules may include at least an energy supply module, such as a fuel cell, and an energy storage module. In order to removably connect the plurality of modules, an electrical power connection of at least one of the modules may be coupled to the electrical power connection of at least one docking fixture. In addition, a fluid connection of at least one of the modules may be coupled to the fluid connection of at least one docking fixture. In addition, a data communication connection of at least one of the modules may be coupled to the data communication connection of at least one docking fixture.

In order to removably connect a plurality of modules to respective ones of the docking fixtures in accordance with one embodiment, the method may facilitate the removable connection of at least one module to a respective docking fixture with at least one guide pin. In addition to removably connecting the energy supply module and the energy storage module to respective docking fixtures, the method of one embodiment may also couple a fluid connection of a cooling module to the fluid connection of a respective docking fixture. Similarly, the method of one embodiment may removably connect a crew component load and/or an external power consumption load to a respective docking fixture. In addition, the method of one embodiment may provide for sharing a common fluid between the plurality of docking fixtures and the plurality of modules.

The features, functions, and advantages that have been discussed can be achieved independently and various embodiments of the present disclosure may be combined in yet other embodiments, further details of which can be seen with reference to the following description and drawings.

BRIEF DESCRIPTION OF THE SEVERAL VIEWS OF THE DRAWINGS

Figure 1:
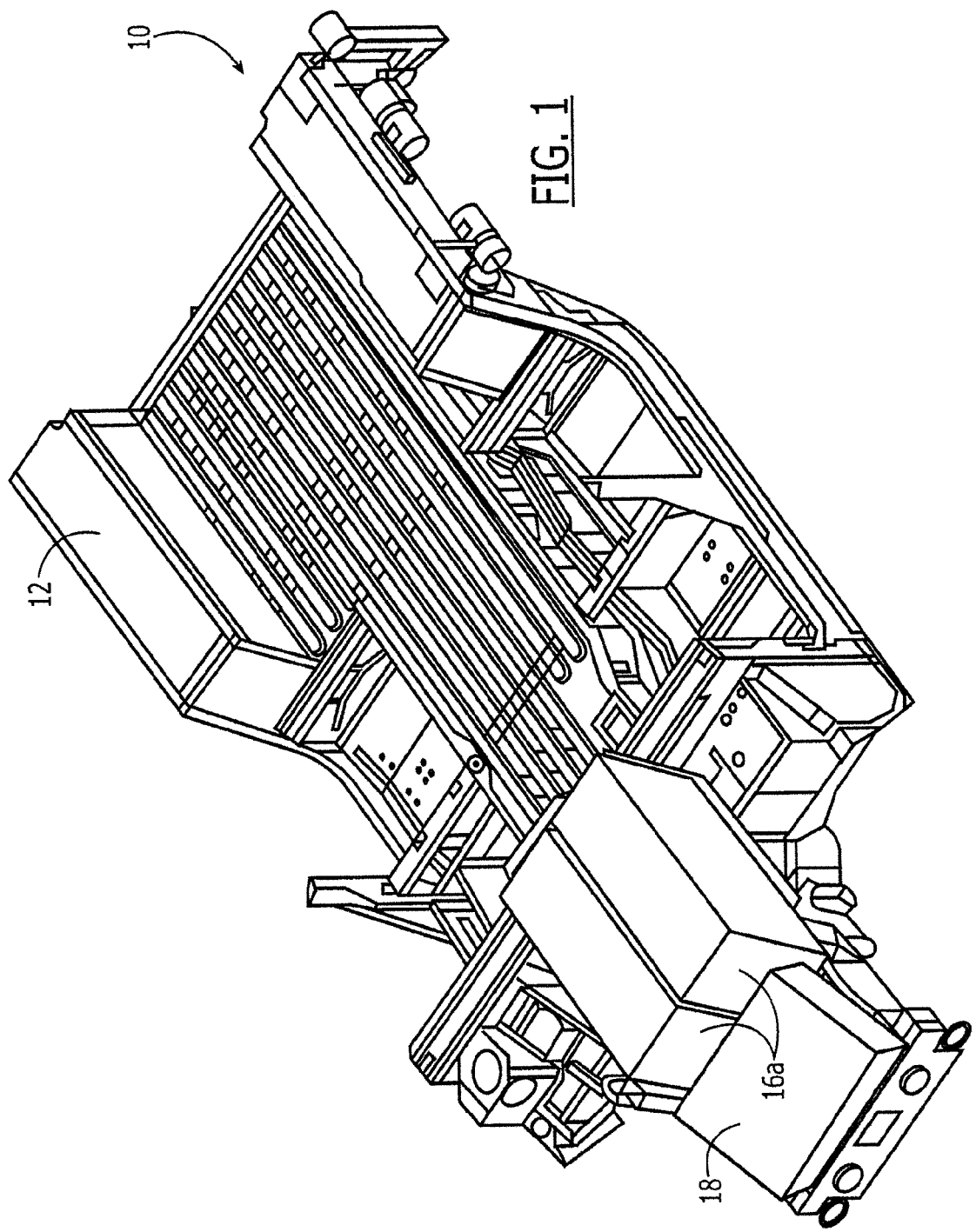
Figure 2:
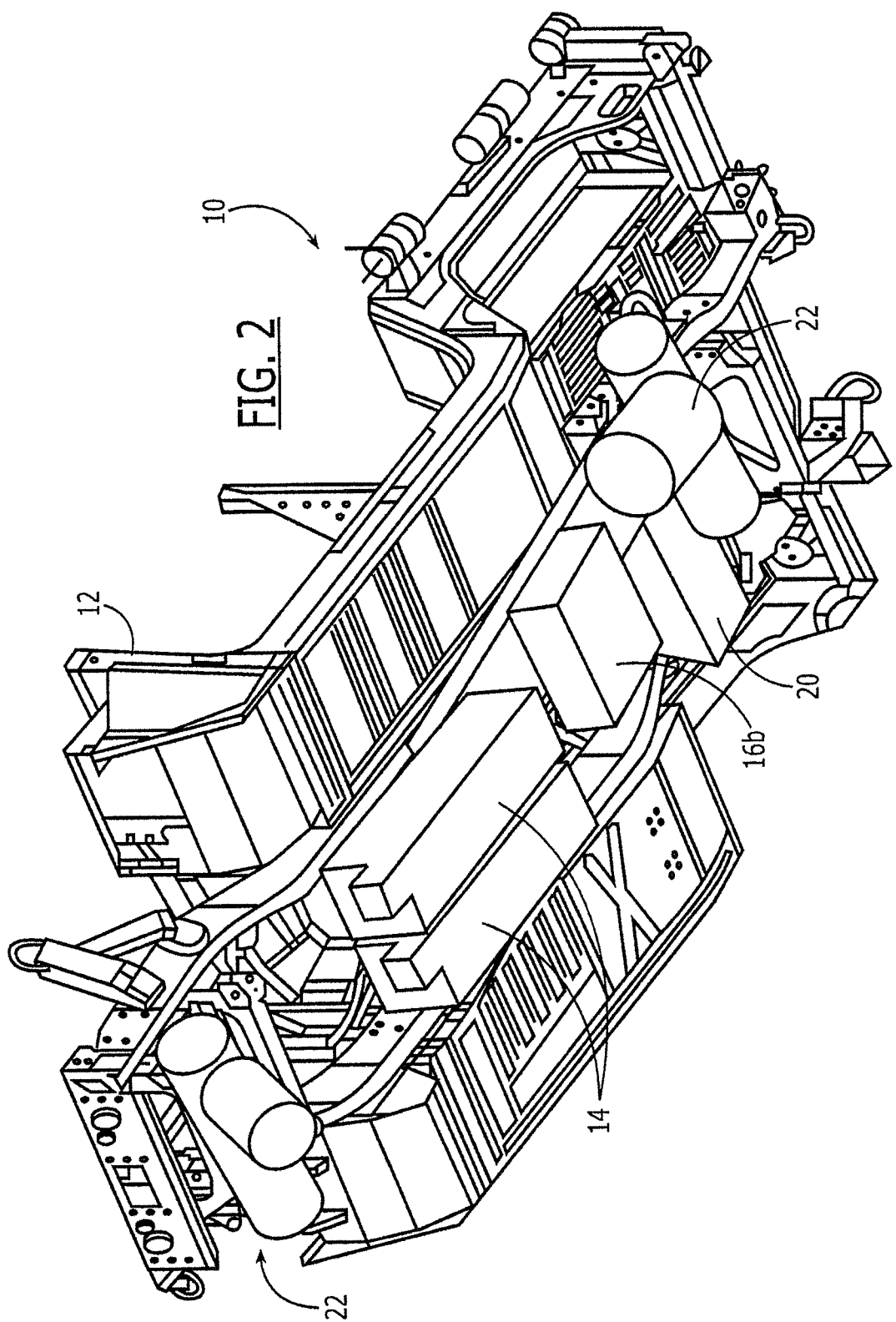
Figure 3:
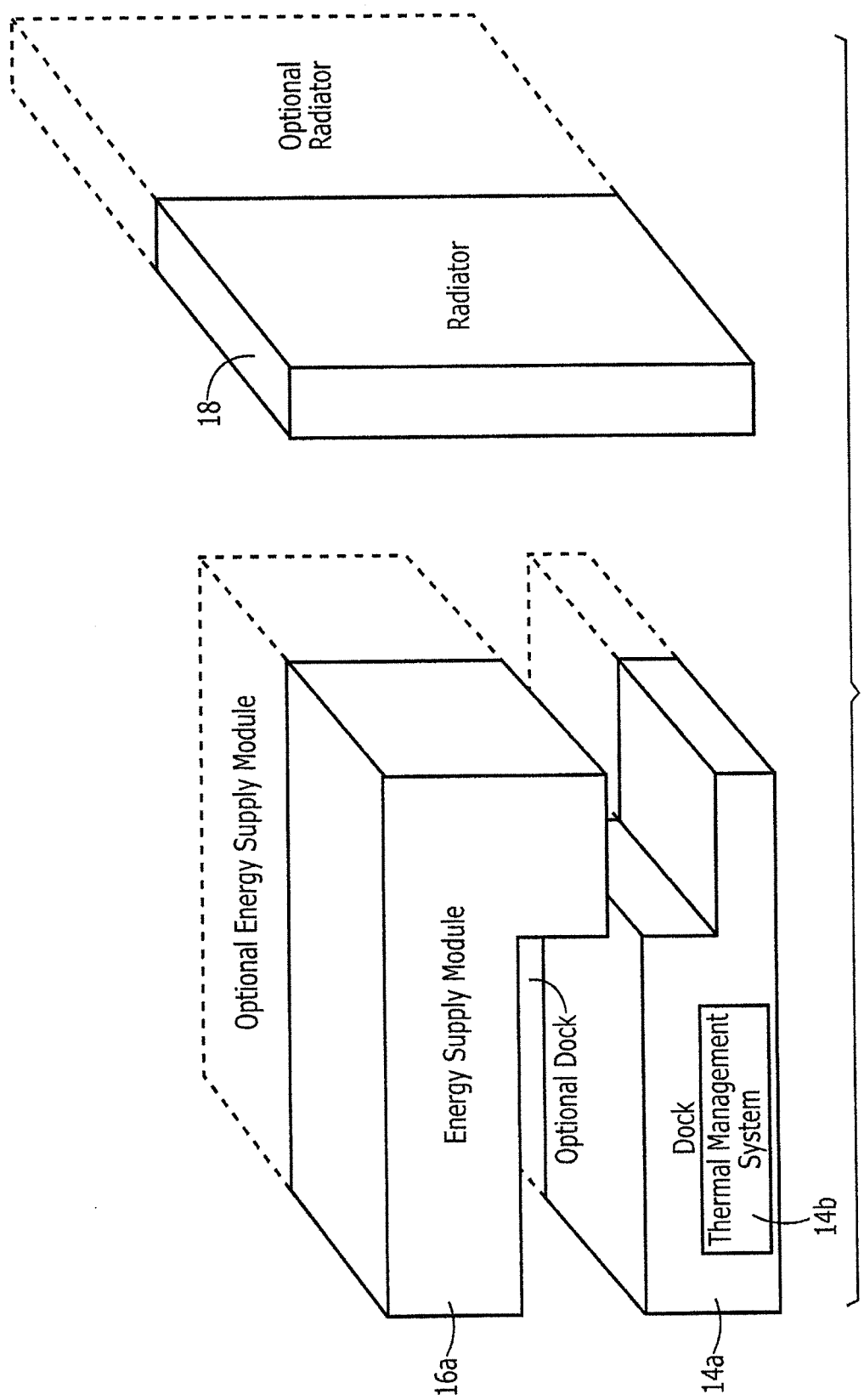
Figure 4:
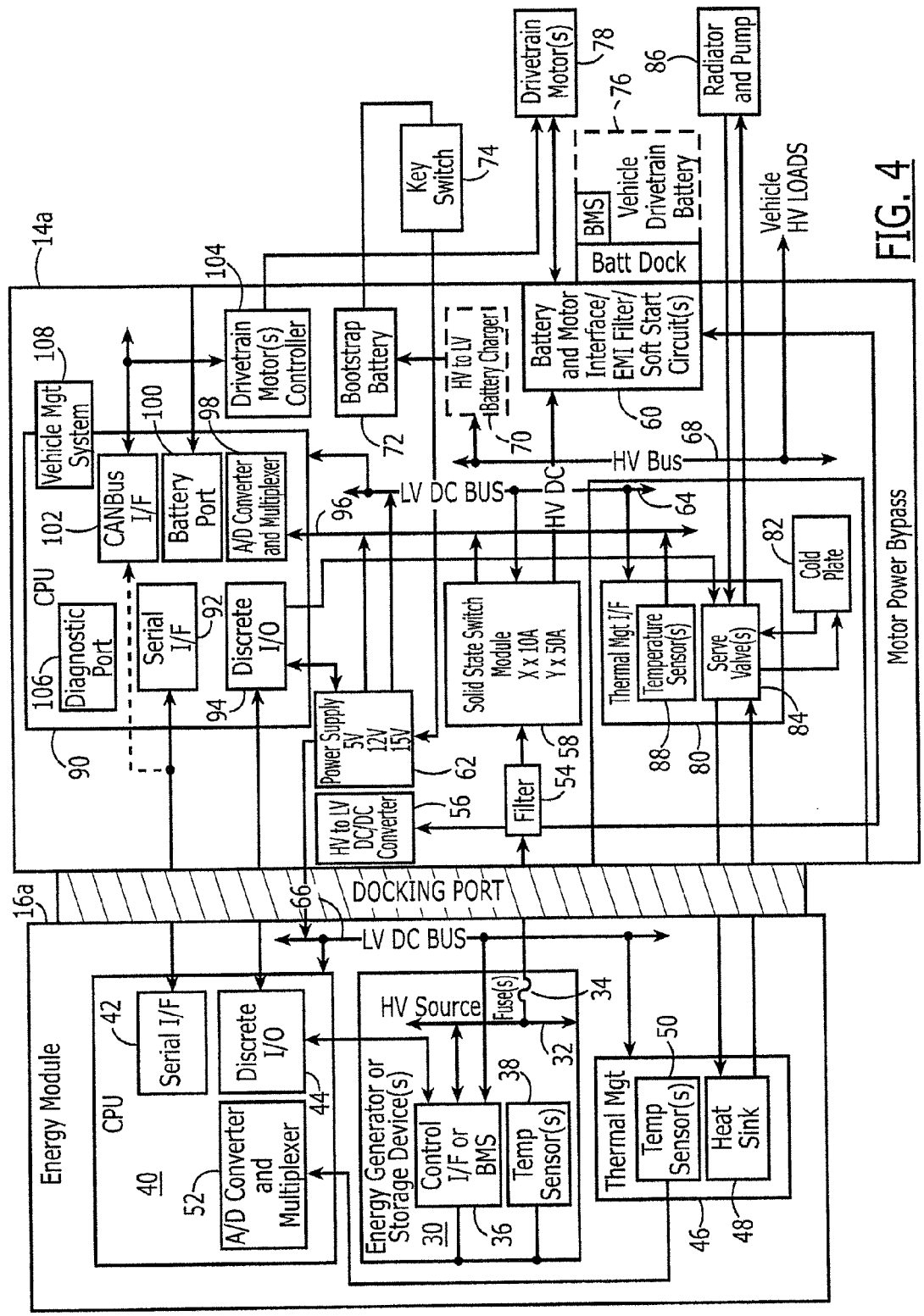
Figure 5A:
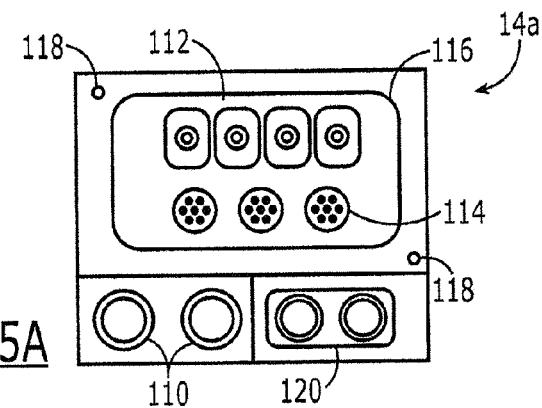
Figure 5B:
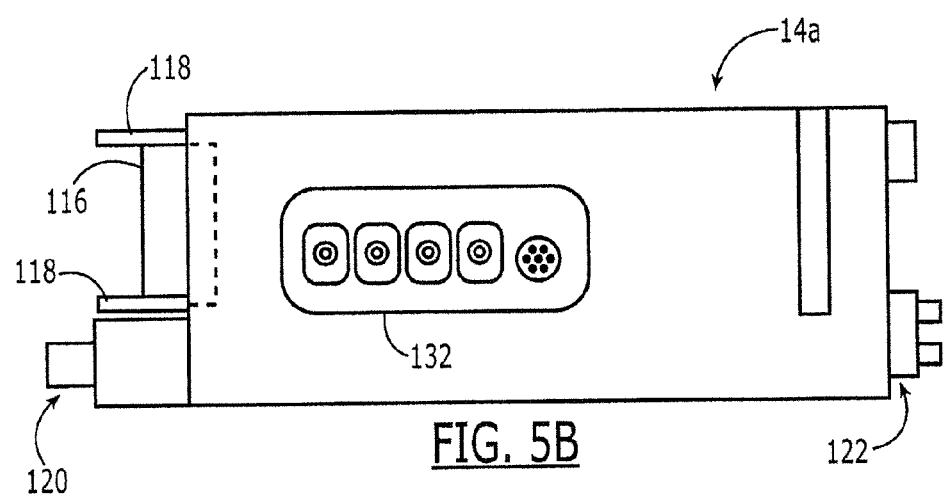
Figure 5C:
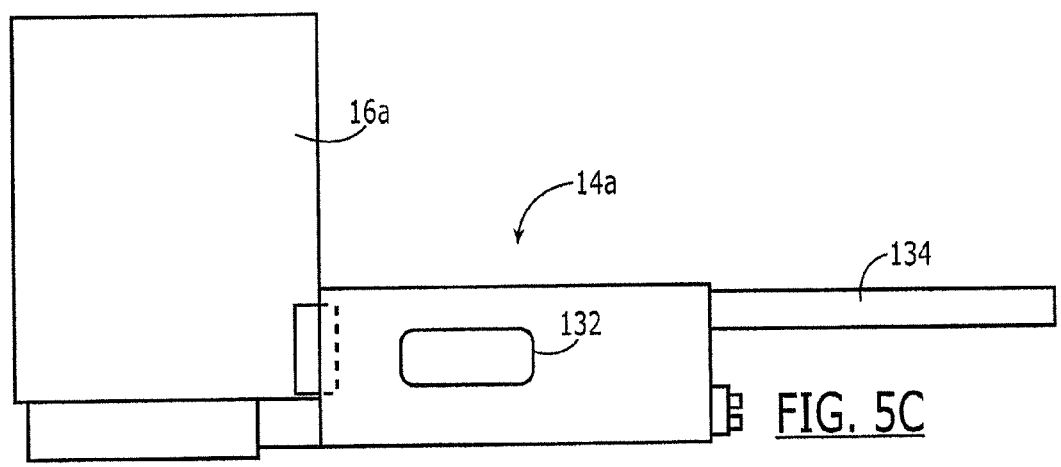
Figure 6B:
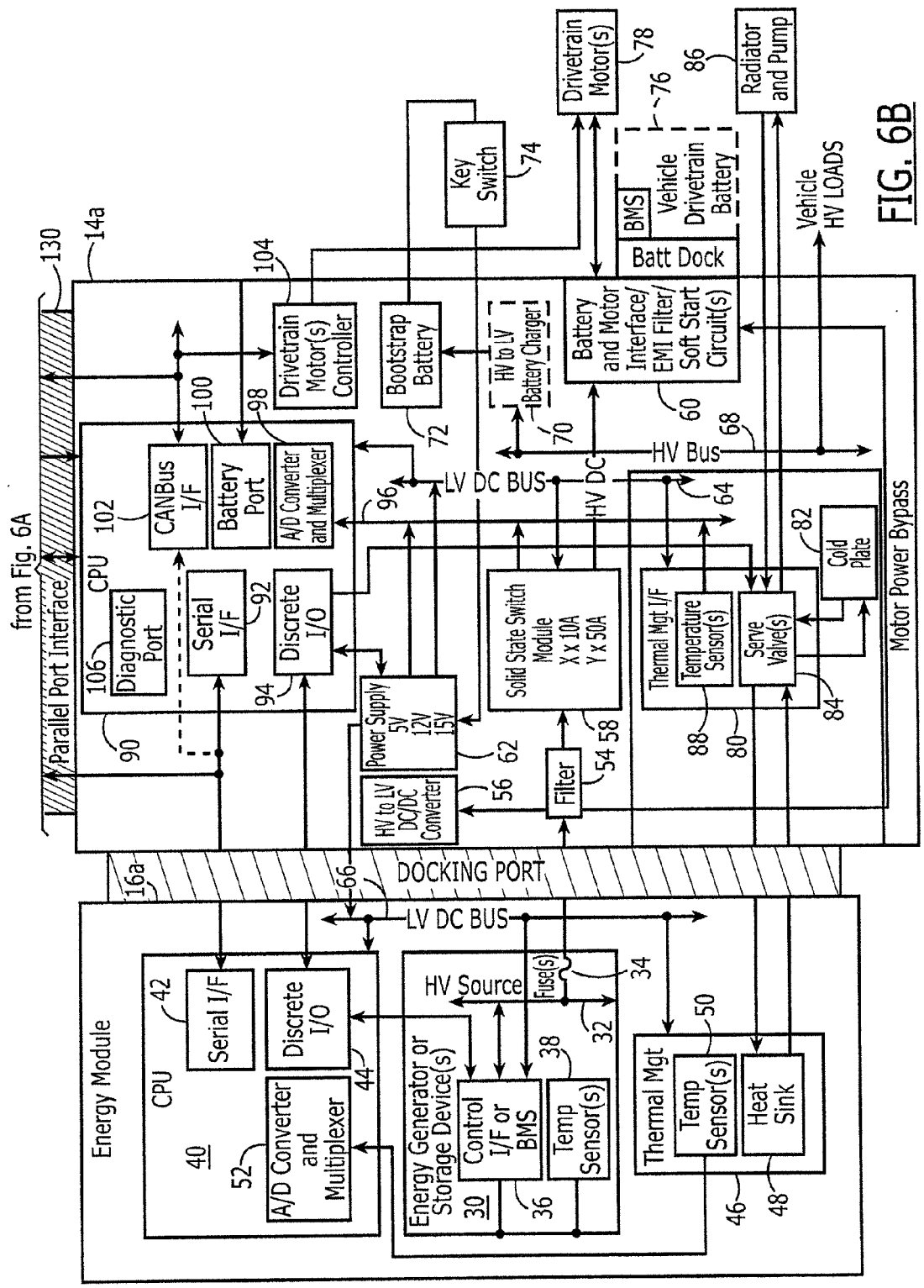
Figure 7A:
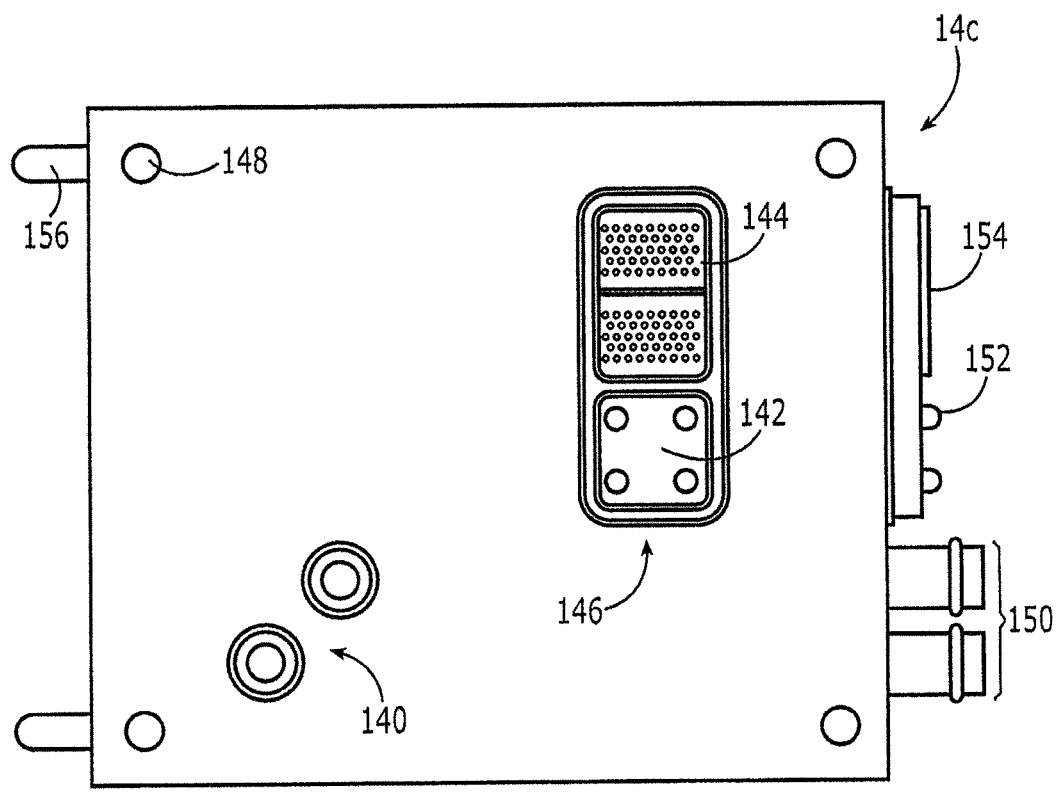
Figure 7B:
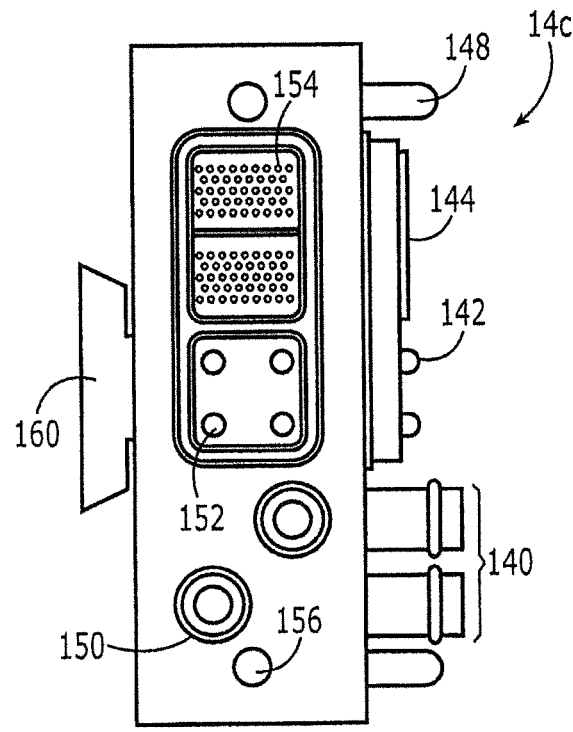
Figure 7C:
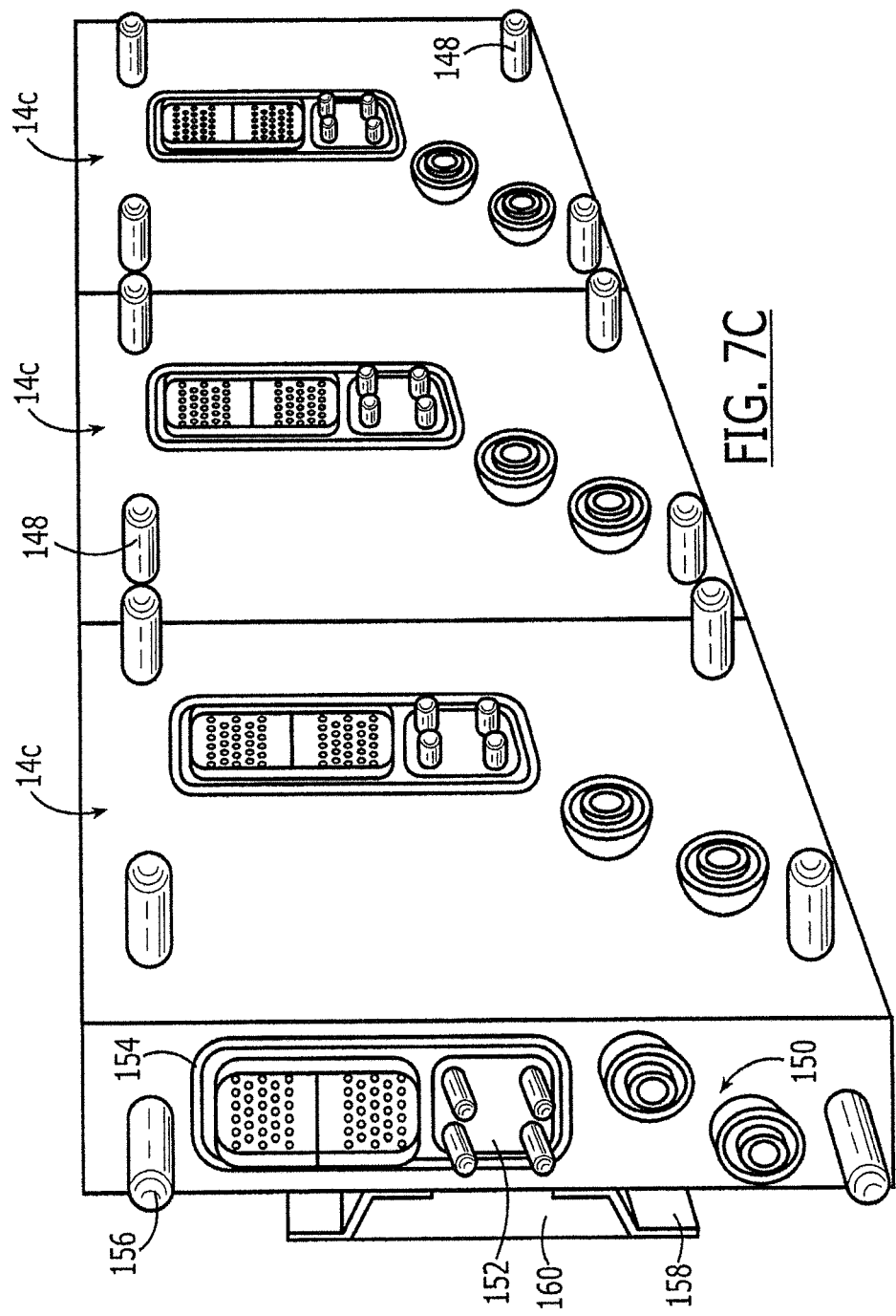
Figure 8:
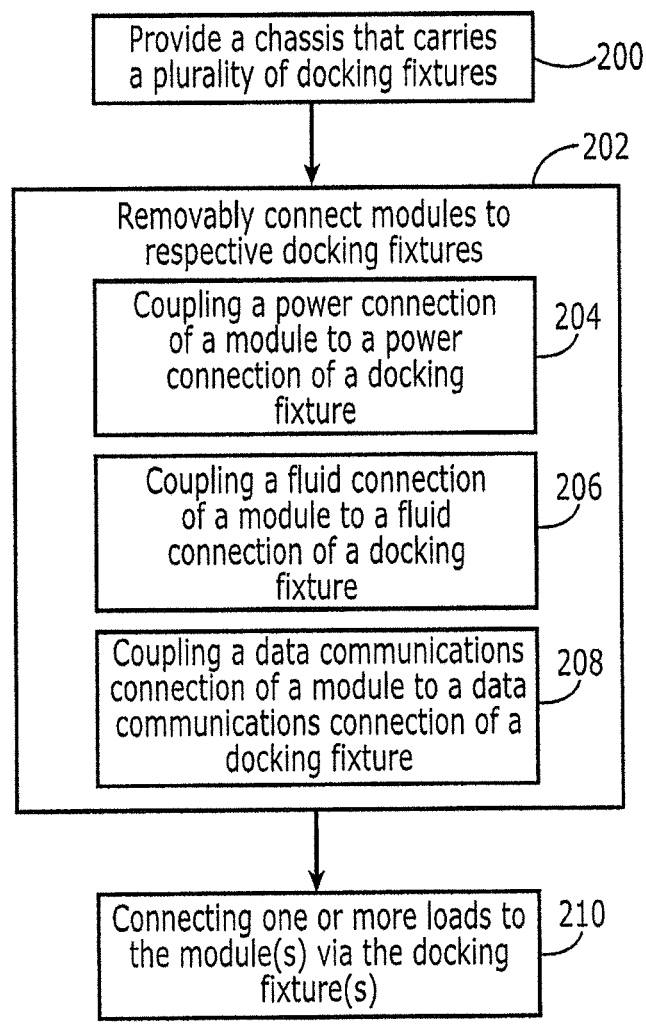

Having thus described embodiments the disclosure in general terms, reference will now be made to the accompanying drawings, which are not necessarily drawn to scale, and wherein:

FIG. 1 is a perspective view of a modular vehicle in accordance with one embodiment of the present disclosure;

FIG. 2 is a perspective view of the underside of the modular vehicle of FIG. 1;

FIG. 3 is a block diagram of a plurality of docking fixtures and a plurality of modules in accordance with one embodiment of the present disclosure;

FIG. 4 is a block diagram of an energy supply module and an associated docking fixture in accordance with one embodiment of the present disclosure;

FIG. 5A is a front view of a docking fixture for an energy supply module in accordance with one embodiment of the present disclosure;

FIG. 5B is a side view of the docking fixture of FIG. 5A;

FIG. 5C is a side view of the docking fixture of FIGS. 5A and 5B which illustrates its connection to an energy supply module;

FIG. 6 is a block diagram of two energy supply modules and the associated docking fixtures that are arranged in a parallel configuration in accordance with one embodiment of the present disclosure;

FIG. 7A is front plan view of a docking fixture for an electrical supply module in accordance with one embodiment of the present disclosure;

FIG. 7B is a side plan view of the docking fixture of FIG. 7A;

FIG. 7C is a perspective view of a plurality of docking fixtures for respective electrical storage modules in accordance with one embodiment of the present disclosure; and FIG. 8 is a flowchart of the operations performed in accordance with a method of constructing a modular vehicle in accordance with one embodiment of the present disclosure.

DETAILED DESCRIPTION

The present disclosure now will be described more fully hereinafter with reference to the accompanying drawings, in which some, but not all embodiments are shown. Indeed, these embodiments may be embodied in many different forms and should not be construed as limited to the embodiments set forth herein; rather, these embodiments are provided so that this disclosure will satisfy applicable legal requirements. Like numbers refer to like elements throughout.

A modular vehicle 10 in accordance with one embodiment of the present disclosure is depicted in FIGS. 1 and 2. As shown, the modular vehicle 10 includes a chassis 12. Although the illustrated embodiment depicts a chassis 12 for a wheeled vehicle, such as a high mobility multipurpose wheeled vehicle (HMMWV), the modular vehicle 10 may be any of a wide variety of other types of wheeled vehicles, including both commercial and military vehicles. In addition, the modular vehicle 10 of other embodiments may be a tracked vehicle, such as a tank, a bulldozer or other construction or military vehicle, or a marine vehicle, such as a ship. In these instances, the modular vehicle 10 would also include a chassis 12, although the chassis 12 may be configured somewhat differently as known to those skilled in the art in order to support other types of wheeled vehicles, or tracked or marine vehicles.

In addition to the chassis 12, the modular vehicle 10 includes a plurality of docking fixtures 14 carried by the chassis 12 as well as a plurality of modules 16 removably connected to respective ones of the docking fixtures 14. Typically, the docking fixtures are securely connected to the chassis 12, such as by bolts, weldments or other types of connectors. On the other hand, modules 16 may be plugged into or otherwise connected to the respective docking fixtures 14 in such a manner that the modules 16 may subsequently be removed without damage to the docking fixtures 14 and generally without requiring extensive, if any, rework or repair of the docking fixtures 14 or the modules 16. Although the modular vehicle 10 includes a plurality of modules 16, the number of modules and the type and mix of modules 16 may be determined during the design and construction of the modular vehicle 10. As such, the modular vehicle 10 may be adapted to more closely satisfy the projected operational requirements for the modular vehicle 10 following its deployment. For example, the plurality of modules 16 may include an energy supply module, such as a fuel cell, a combustion generation module, a MICE engine or the like. Additionally, the plurality of modules 16 may include an energy storage module, such as one or more batteries, e.g., LiIon batteries, and/or a cooling module, such as thermal control system. Additionally or alternatively, the modular vehicle 10 may include modules 16 comprised of a crew compartment load, an external power consumption load or other types of modules.

By way of example, the modular vehicle 10 depicted in FIGS. 1 and 2 includes a pair of energy supply modules in the form of combustion generator modules 16a, two or more energy storage modules in the form of lithium battery packs 16b and an external power consumption load in the form of an exportable power unit 20 for providing power, for example, to various external loads, such as communications equipment, lighting or the like. Additionally, the modular vehicle 10 may include traction motors and transmissions 22 for the front and rear axles which may be powered by the energy supply modules 16a and/or the energy storage modules 16b. Although not depicted in FIGS. 1 and 2, the modular vehicle 10 may also include various crew compartment loads, such as a heating and air conditioning unit, a radio, windshield wipers or the like, and/or other loads, such as actuators, e.g., electric motors and wheels.

As will be described hereinafter, the chassis 12 of the modular vehicle 10 carries docking fixtures 14 for receiving the respective modules 16 and for facilitating the interconnection of the modules 16 in the desired manner. By way of example, FIG. 3 depicts a plurality of modules 16 and a plurality of associated docking fixtures 14 for interconnecting the modules 16. In this regard, three different types of modules are depicted, namely, an energy supply module 16a, a high voltage (HV) power distribution unit (PDU) 16c and a cooling module, such as a thermal management system 16d. In order to receive and appropriately interconnect the various modules 16, the chassis 12, such as that depicted in FIGS. 1 and 2, carries a plurality of docking fixtures 14. In this embodiment, the chassis 12 carries a docking fixture 14a to interconnect the energy supply module 16a with the power distribution unit 16c in order to distribute the power generated by the energy supply module 16a to various loads, such as crew compartment loads, external power consumption loads or other loads on or off board the modular vehicle 10. Since the energy supply module 16a may require cooling for improved efficiency, reduced signature or the like, the chassis 12 of this embodiment may also carry a docking fixture 14b to interconnect the energy supply module 16a and the cooling module, such as the thermal management system 16d. Additionally, the docking fixture 14b that facilitates the connection of the energy supply module 16a and the cooling module, such as the thermal management system 16d, to facilitate thermal management of the energy supply module 16a, such as by the controlled circulation of a cooling fluid or the like through the energy supply module 16a in order to remove waste heat or the like.

In one embodiment as depicted in FIG. 3, each module is removably connected to a respective docking fixture 14, that is, the power distribution unit 16c is connected to a respective docking fixture 14a, the cooling module, such as the thermal management system 16d, is connected to a respective docking fixture 14b and the energy supply module 16a is connected to one or more docking fixtures 14a. The docking fixtures, in turn, may be interconnected, such as via wiring, conduits or the like carried by or extending through the chassis 12 in order to interconnect the various modules 16. While the energy supply module 16a may be removably connected to a single docking fixture that, in turn, is interconnected to the docking fixture 14a of both the power distribution unit 16c and the docking fixture 14b of the cooling module, such as a thermal management system 16d, the energy supply module 16a may be removably connected to a pair of docking fixtures 14a, 14b as shown in FIG. 3 with one docking fixture 14a configured to be interconnected to the docking fixture 14a of the power distribution unit 16c and the other docking fixture 14b configured to be interconnected with the docking fixture 14b of the thermal management system 16d.

The modules 16 may also be connected to other components in addition to a docking fixture 14. As shown in FIG. 3, for example, the cooling module, such as the thermal management system 16d, may also be connected to a radiator 18 so as to controllably circulate the cooling fluid between the radiator 18 and the energy supply module 16d. In addition to or instead of circulating coolant, other fluids may be circulated through modules 16 including, for example, fuel and/or other gaseous streams, e.g., air for combustion or exhaust air.

As illustrated in the embodiment of FIGS. 1 and 2 as well as the embodiment of FIG. 3, the modular vehicle 10 may include multiple modules 16 of the same type. With respect to the modular vehicle 10 of FIGS. 1 and 2, the modular vehicle 10 includes a pair of combustion generator modules 16a as well as two or more battery packs 16b. Similarly, the embodiment of FIG. 3 depicts the power distribution unit 16c being configured to separately interconnect, via respective docking fixtures 14a, with a pair of energy supply modules 16a. In the embodiment in which that portion of the modular vehicle 10 depicted in FIG. 3 includes a pair of energy supply modules 16a, a second cooling module, such as a second thermal management system 16d, may also be provided to interface, via appropriate docking fixtures 14b, with the additional energy supply module 16a. In embodiments that include multiple cooling modules, such as shown in FIG. 3, the radiator 18 may be enlarged or an additional radiator may be provided for fluid connection to the additional cooling module 16a.

By facilitating the optional inclusion of multiple modules 16 of the same type, the modular vehicle 10 of embodiments of the present disclosure may be more closely adapted to the anticipated performance requirements demanded of the modular vehicle 10 once deployed. As such, a common chassis 12 may be provided, but one modular vehicle that will be required to service relatively large power loads, such as external power loads, may include a number of energy supply modules 16a, typically configured in parallel, while another modular vehicle utilizing the same type of chassis 12 but designed for use in situations demanding much lower power consumption may include only a single energy supply module 16a. As such, the modular vehicle 10 of embodiments of the present disclosure facilitates the adaptability of the modular vehicle 10 such that resulting modular vehicles 10 more efficiently meet the design objectives and can be more individually tailored to their respective deployment scenarios.

Although the modules 16 and the corresponding docking fixtures 14 will vary in construction depending upon the type of module 16 and the type of interconnections that must be facilitated by the docking fixture 14, one example of an energy supply module 16 and an associate docking fixture 14 is provided by FIG. 4. In this regard, the energy supply module 16a includes an energy generator or storage device 30, such as a combustion generator, a fuel cell or the like. The energy generator or storage device 30 may establish a relatively high voltage level on a high voltage bus 32. This high voltage bus 32 is, in turn, connected via a fuse 34 or other protection device, to the docking fixture 14a for further distribution, as described below, to various high voltage loads on or off board the modular vehicle 10. As shown, the energy generator or storage device 30 may also include a control interface (I/F) or bus management system (BMS) 36 for monitoring and controlling the high voltage bus as well as a temperature sensor 38 for monitoring the temperature of the energy generator or storage device 30.

As depicted in FIG. 4, the energy supply module 16a may also include a processor 40, such as a central processing unit (CPU). The processor 40 is configured to facilitate data communication between the energy supply module 16 and the docking fixture 14a and, in turn, with other modules and/or loads with which the docking fixture 14a communicates. As shown, for example, the processor 40 of the energy supply module 16a may include a serial interface (I/F) 42 for communicating with a corresponding serial interface (I/F) 92 of the docking fixture 14a as well as discrete inputs and outputs (I/O) 44 for communicating with corresponding discrete inputs and outputs (I/O) of the docking fixture 14a. In this regard, the discrete inputs and outputs 44 may include data provided by or to the control interface or bus management system 36 and may be indicative, for example, of the status of the high voltage bus 32. The energy supply module 16a may also include a thermal management unit 46. The thermal management unit 46 may include a heat sink 48 for temporary storage of heat generated by the energy generator or storage device 30. The thermal management unit 46 may also include a temperature sensor 50 for monitoring the temperature of the heat sink 48. As shown, the temperature sensors 38, 50 of the energy generator or storage device 30 and the thermal management unit 46 may report to the processor 40, such as via an analog to digital converter and multiplexer 52, such that the processor 40 may monitor the temperatures sensed by the temperature sensors 38, 50 of the energy generator or storage device 30 and the thermal management unit 46 and facilitate control of the respective temperatures by means of a coolant circulated modules via the docking fixture 14a. In this regard, the processor 40 may provide information regarding the respective temperatures of the energy generator or storage device 30 and the thermal management unit 46 to the docking fixture 14a, such as via the serial interface 42 and/or the discrete inputs and outputs 44.

As also depicted in FIG. 4, the docking fixture 14a associated with the energy supply module 16a may include a number of components for communicating with corresponding components of the energy supply module 16a and for correspondingly interconnecting the energy supply module 16a with other modules 16 and/or components of the modular vehicle 10. In this regard, the docking fixture 14a is configured to receive the high voltage output provided by the energy generator or storage device 30 of the energy supply module 16a. In the illustrated embodiment, the docking fixture 14a includes a filter 54 for filtering the high voltage signals provided by the energy supply module 16a prior to providing the high voltage signals to a high voltage to low voltage DC/DC converter 56, a solid state switch module 58 and a battery and motor interface 60. As to the high voltage to low voltage DC/DC converter 56, the high voltage signals are converted to lower voltage signals and are provided, for example, to a power supply 62 that may supply one or more levels of low voltage signals, such as 5 volts, 12 volts and 15 volts in the illustrated embodiment. The power supply may, in turn, provide one or more of the lower voltages to a low voltage DC bus 64 within the docking fixture 14a and a low voltage DC bus 66 within the energy supply module 16a. These low voltage DC busses may then provide appropriate levels of DC power to various components of the docking fixture 14a and the energy supply module 16a. For example, the low voltage DC bus 66 of the energy supply module 16a may provide low voltage DC power to the processor 40, the thermal management unit 46 and the control interface or bus management system 36.

The solid state switch module 58 of the docking fixture 14a also receives the high voltage signals and provides outputs at different current levels, such as 10 amps and 50 amps in one embodiment. In this regard, the different current levels may be provided by the solid state switch module 58 to a high voltage bus 68 within the docking fixture 14a. The high voltage bus 68 of the docking fixture 14a may then provide high voltage signals to various vehicle loads, such as the traction motors and transmissions 22 for the front and rear axles as shown in FIG. 2, crew compartment loads or the like. In addition, the high voltage bus 68 may provide high voltage signals to the battery and motor interface 60 as well as to a high voltage to low voltage battery charger 70. In this regard, the high voltage to low voltage battery charger 70 may serve to charge a bootstrap battery 72 which may be connected via an external key switch 74 to the power supply 62. The battery and motor interface 60 of the illustrated embodiment also receives high voltage signals via the high voltage bus 68 and, in one embodiment, also from the filter 54 in the form of motor power bypass signals. In addition to providing an interface with external battery and motor(s), the battery motor interface 60 may also include a filter, such as an electromagnetic interference filter, and soft start circuit(s). As shown in FIG. 4, the battery motor interface 60 may be connected to one or more batteries, such as a vehicle drivetrain battery 76, and/or one or more motors, such as one or more drivetrain motors 78, thereby providing the battery and motors with appropriate high voltage signals.

The docking fixture 14a may also include a thermal management unit 80 including or associated with a cold plate or other heat sink 82. In the illustrated embodiments in which a cooling fluid is circulated through the energy supply module 16a in order to cool the energy generator or storage device(s) 30, the thermal management unit of the docking fixture 14a may include one or more valves 84, such as servo valves, for controlling the fluid flowing between an external radiator and a pump 86, the heat sink 48 of the energy supply module 16a and a cold plate 82 of the docking fixture 14a. Additionally, the thermal management unit 80 may include a temperature sensor 88 that facilitates monitoring of the temperature of the cold plate 82 such that the valves 84 may be appropriately controlled in order to circulate a sufficient quantity of coolant to maintain the energy generator or storage device(s) 30 at the desired temperature.

The docking fixture 14a may also include a processor 90, such as a central processing unit (CPU), for interfacing with a number of the other components. In this regard, the processor 90 may include a serial interface (I/F) 92 and discrete inputs and outputs (I/O) 94 for facilitating data communication with the serial interface 42 and the discrete inputs and outputs 44, respectively, of the processor 40 of the energy supply module 16a. As illustrated, the discrete inputs and outputs 94 can also communicate with the solid state switch module 58, the power supply 62 and the thermal management unit 80, such as the valves 84, in order to appropriately control operation of those components and/or to receive feedback regarding their operation.

The docking fixture 14a may include a data bus 96 that may be connected to the power supply 62, the solid state switch module 58 and the thermal management unit 80, such as the temperature sensor 88. The processor 90 of the docking fixture 14a may also be connected to the data bus 96 and, in the illustrated embodiment, may include an analog to digital (A/D) converter and multiplexer 98 configured to interface with the data bus 96. As such, the processor can receive information regarding the status of the various components and can provide direction to the components via the data bus 96 and/or the discrete inputs and outputs 94. The processor 90 of the docking fixture 14a may also include a battery port 100 for communicating with the off board vehicle batteries 76, such as the drivetrain batteries, as well as a control and telemetry interface 102 for communicating, such as via a motor controller 104, with the off board motor(s), such as drivetrain motors 78. Further, the processor 90 may include a diagnostic port 106 for facilitating troubleshooting or other maintenance operations for the docking fixture 14a and the energy supply module 16a connected thereto. Additionally, the processor 90 of the docking fixture 14a may be in communication with the vehicle management system 108.

Although one embodiment of an energy supply module 16a and associated docking fixture 14a is depicted in FIG. 4 and described above, this embodiment is provided for purposes of illustration and is merely one example with such modules 16 and associated docking fixtures 14 being configured in different manners in other embodiments depending upon the type of module 16 and the type of communication and control desired with respect to the module 16. In any event, the docking fixture 14 is configured to communicate with the module 16, such as via data communication, power communication and/or fluid communication, and, in turn, interface the module 16 with other modules or other components either onboard or off board the modular vehicle 10.

In order to facilitate the removable connection of a module 16 to a docking fixture 14, the docking fixture 14 and the module 16 may include one or more of an electrical power connection, a fluid connection and a data communication connection. With respect to the embodiments of the energy supply module 16a and associated docking fixture 14a depicted in FIG. 4, the energy supply module 16a and the docking fixture 14a each includes a plurality of electrical power connections, a plurality of data communication connections and a fluid connection. Although the manner in which the connections may be made may widely vary without departing from the spirit and scope of the present disclosure, the docking fixture 14a of one embodiment for facilitating removable connection with a energy supply module 16a, such as shown in FIG. 4, is depicted in FIGS. 5A-5C. As shown in FIG. 5A, the docking fixture 14a may include first and second fluid connections 110 that serve to supply cooling fluid to the energy supply module 16a and that serve to receive coolant from the energy supply module 16a following circulation therethrough. While the fluid connections 110 may be configured in various manners, the fluid connections 110 of one embodiment are quick disconnect fluid connections. The docking fixture 14a of the illustrated embodiment also includes electrical power connections 112 for permitting high voltage and low voltage signals to be transmitted between the energy supply module 16a and the docking fixture 14a. Further, the docking fixture 14a of the illustrated embodiment may include a plurality of data communication connection 114, such as the plurality of seven-pin connectors depicted in FIG. 5A. However, both the electrical power connections and the data communication connections can be constructed in different manners in other embodiments of the present disclosure. For example, the data communication connections may be CANbus connections, 422 connections, 232 connections or the like. To facilitate the robust nature of the modular vehicle 10, the docking fixture 14a may include an environmentally sealed interface 116 surrounding the electrical power connections 112 and the data communication connections 114. Additionally, the docking fixture 14a may include one or more guide pins 118 for facilitating connection with the respective module 16 in an aligned manner. As will be understood, the energy supply module 16a may also include corresponding electrical power connections, fluid connections and data communication connections to mate with the respective connections of the docking fixture. Additionally, the energy supply module 16a may include holes positioned inside so as to receive the guide pins 118, thereby aligning the module 16 with the docking fixture 14.

As shown in FIGS. 5B and 5C, the docking fixture 14 may also include connections to other components. For example, the docking fixture may include a thermal docking port 120 including additional fluid connections for connection to an external radiator and pump 86. In this regard, the thermal docking port 120 may include a first fluid connection for receiving coolant from the radiator and pump 86 and a second fluid connection for returning coolant to the radiator and pump 86 following circulation through the energy supply module 16a. Additionally, the docking fixture 14 may include a motor power port 122 including one or more electrical power connections for providing power to an external motor, such as a drivetrain motor 78.

As noted above, the modular vehicle 10 may include any number of modules 16 of the same type. For example, the modular vehicle 10 may include two or more energy supply modules 16a with each energy supply module 16a being connected in parallel to a respective docking fixture 14a. By including a selectable number of modules 16 of the same type, such as energy supply modules 16a, the capacity and performance characteristics of the modular vehicle 10 may be individually tailored. For example, a modular vehicle 10 having multiple energy supply modules 16a may be capable of providing more power in anticipation of deployment in scenarios requiring greater power, while other modular vehicles 10 having a single energy supply module 16a may be intended to be deployed in scenarios anticipated to require lower power levels.

By way of example, FIG. 6 depicts two energy supply modules 16a removably connected to respective docking fixtures 14a. As will be apparent, each pair of energy supply modules 16a and docking fixtures 14a is of the type depicted in FIG. 4 and described above. However, the docking fixtures 14a are connected to one another, such as via a parallel port interface 130, so as to facilitate the transmission of data, power and/or coolant therebetween. Although the interface 130 between the docking fixtures 14a may vary, the docking fixtures 14a of the illustrated embodiment include data communication connections, such as to provide data from the processor 90 of the docking fixture 14a and/or the processor 40 of the associated energy supply module 16a to the other docking fixture 14a. In the illustrated embodiment, for example, the discrete inputs and outputs and the control and telemetry interface 102 are connected to the other docking fixture 14a. Additionally, the high voltage power bus 68 and/or the coolant or other fluid may be shared between the docking fixtures 14a for redundancy, reliability or other purposes. The docking fixtures 14a may operate in concert and, in one embodiment, one of the docking fixtures may be identified to be the master docking fixture with the other docking fixture being identified to be a slave docking fixture. In this embodiment, the master docking fixture can at least partially control the operation of the slave docking fixture.

Although the parallel port interface 130 between the docking fixtures 14a may be provided in various manners, the docking fixture 14a illustrated in FIGS. 5A-5C may include an expansion port 132 to facilitate interconnection with another docking fixture 14a, thereby providing for a parallel port interface 130. In the illustrated embodiment, the expansion port 132 includes electrical power connections and data communication connections. However, the expansion port 132 may also include one or more fluid connections, if so desired. In order to facilitate a further connection with an additional docking fixture, the docking fixture 14a depicted in FIGS. 5A-5C may include additional expansion ports, such as on opposite sides of the housing.

From a mechanical standpoint, the docking fixtures 14a and the chassis 12 may include complimentary rails and a rail interface for facilitating mounting of the docking fixtures 14 in a predefined location relative to the chassis 12. In addition, by utilizing a rail or other elongate mounting structure, multiple docking fixtures 14 may be mounted to the same rail or other mounting structure so as to facilitate the aligned relationship of the docking fixtures 14 such that those docking fixtures 14 that are disposed in a parallel configuration may be more readily interconnected. For example, FIG. 5C depicts a rail 134 on which the docking fixture 14a may be mounted.

One example of a docking fixture 14a to be used with an energy supply module 16a is depicted in FIGS. 5A-5C and is described above. However, as noted, the docking fixture 14 may have other configurations depending upon the type of connections to be made, the type of module 16 with which the docking fixture 14 will mate and the like. As another example, FIGS. 7A and 7B illustrate a docking fixture 14c for an energy storage module 16b. As shown in this instance, the docking fixture 14c includes multiple fluid connections 140 for facilitating fluid circulation between the energy storage module 16b that would be removably connected to the docking fixture and an external radiator 18 or other source of coolant or other fluid. Additionally, the docking fixture 14c includes a plurality of electrical power connections 142 and a plurality of data communication connections 144 disposed within an environmentally sealed interface 146 for connection with corresponding electrical power connections and data communication connections of an energy storage module 16b.

A modular vehicle 10 may include a plurality of energy storage modules 16b arranged, for example, in parallel with each energy storage module 16b removably connected to a respective docking fixture 14c. As such, the modular vehicle 10 may include a plurality of docking fixtures 14c with the docking fixtures 14c interconnected to one another as depicted in FIG. 7C. In this regard, the docking fixtures 14c may be interconnected via a parallel port interface shown in FIGS. 7B and 7C, which may also include a plurality of electrical power connections 152, data communication connections 154 and fluid connections 150 to facilitate circulation of fluid and power through the various docking fixtures 14c in a controlled fashion. In order to facilitate the alignment of a docking fixture 14c with a corresponding energy storage module 16b, the docking fixture 14c may include one or more guide pins 148 and/or one or more guide pin holes for mating with corresponding guide pin features of the respective energy storage modules 16b. In addition, the docking fixtures 14c can include guide pins 156 and/or guide pin holes for mating with corresponding guide pin features of other docking fixtures 14c to facilitate the parallel alignment and interconnection of adjacent docking fixtures 14c. In order to further facilitate alignment of the docking fixtures 14, the chassis 12 may include one or more mounting rails 158 and the docking fixtures 14 may include a corresponding mounting structure 160 that is received within and engaged by the mounting rails 158 as shown, for example, in FIG. 7C. As such, the mounting rails 158 and associated mounting structure 160 facilitate the aligned positioning of the docking fixtures 14 and the secure affixation of the docking fixtures 14 to the chassis 12.

By utilizing a modular approach, different combinations of modules 16 including different types of modules 16 and different numbers of the same type of modules 16 may be mounted to the same type of chassis 12, therefore adapting the resulting modular vehicles 10 to the anticipated operational characteristics to be demanded of the modular vehicles 10 following deployment. By relying upon a modular approach with the modules 16 being removably connected to corresponding docking fixtures 14, the modules 16 may be more readily replaced so as to accommodate improvements in technology, repair and changes in the operational characteristics to be demanded of the modular vehicle 10. As noted above, the modular vehicle 10 may include any number of energy supply modules 16a to supply a modular vehicle 10 with different levels of power. While the plurality of energy supply modules 16 may all be at the same type, the modular vehicle 10 of one embodiment may include different types of energy supply modules including both combustion generator modules and electrical power generation modules so as to provide customizable hybrid vehicles. Additionally, by including controllers within each module 16 and docking fixture 14, the modules 16 and docking fixtures 14 may be individually managed while taking into account the operation of other related modules 16 so as to provide for efficient operation.

As illustrated in FIG. 8, a modular vehicle 10 may therefore be readily constructed by providing a chassis 12 that carries a plurality of docking fixtures 14. See operation 200. As described above, the docking fixtures 14 may include one of more of an electrical power connection, a fluid connection and a data communication connection. Thereafter, a plurality of modules 16 may be removably connected to respective docking fixtures 14. See operation 202. These modules may include an energy supply module 16a and an energy storage module 16b. In one embodiment, the modules also include a cooling module. In order to removably connect the plurality of modules 16 to respective docking fixtures 14, an electrical power connection of at least one of the modules 16 may be coupled to the electrical power connection of at least one docking fixture 14. See operation 204. In addition, a fluid connection of at least one of the modules 16 may be coupled to the fluid connection of at least one docking fixture 14. See operation 206. And, the data communication connection of at least one module 16 may be coupled to the data communication of at least one docking fixture 14. See operation 208. Thereafter, one or more loads, such as crew compartment loads, external power consumption loads, etc., may be connected to the modules 16 via the docking fixtures 14. See operation 210. As such, the modular vehicle 10 may be readily constructed having operational characteristics that may be tailored to the anticipated deployment scenario, thereby resulting in a modular vehicle 10 that is capable the desired performance, but that may deliver such performance in an efficient manner.

Many modifications and other embodiments of the disclosure set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of constructing a modular vehicle comprising:
providing a chassis that carries a plurality of docking fixtures, wherein at least one of the docking fixtures comprising an electrical power connection, at least one of the fixtures comprising a fluid connection, and at least one of the fixtures comprising a data communication connection; and
removably connecting a plurality of modules to respective ones of the docking fixtures, wherein the plurality of modules comprise at least an energy supply module and an energy storage module, and wherein removably connecting the plurality of modules comprises coupling an electrical power connection of at least one of the modules to the electrical power connection of at least one docking fixture, coupling a fluid connection of at least one of the modules to the fluid connection of at least one docking fixture, and coupling a data communication connection of at least one of the modules to the data communication connection of at least one docking fixture.

2. A method according to claim 1 wherein removably connecting a plurality of modules to respective ones of the docking fixtures further comprises facilitating removable connection of at least one module to a respective docking fixture with at least one guide pin.

3. A method according to claim 1 wherein removably connecting a plurality of modules to respective ones of the docking fixtures further comprises coupling a fluid connection of a cooling module to the fluid connection of a respective docking fixture.

4. A method according to claim 1 further comprising sharing a common fluid between the plurality of docking fixtures and the plurality of modules.

5. A method according to claim 1 wherein removably connecting a plurality of modules to respective ones of the docking fixtures further comprises removably connecting a crew compartment load to a respective docking fixture.

6. A method according to claim 1 wherein removably connecting a plurality of modules to respective ones of the docking fixtures further comprises removably connecting an external power consumption load to a respective docking fixture.

7. A method according to claim 1 wherein the energy supply module comprises a fuel cell.

8. A method according to claim 1 further comprising providing for data communication via the respective electrical power connections of the at least one docking fixture and the at least one module.

9. A method of constructing a modular vehicle comprising:
providing a chassis;
providing a plurality of docking fixtures carried by the chassis with each docking fixture comprising at least one of an electrical power connection, a fluid connection and a data communication connection;
connecting an energy supply module to a respective docking fixture, the energy supply module comprising an electrical power connection coupled to the electrical power connection of the respective docking fixture and a data communication connection coupled to the data communication connection of the respective docking fixture;
connecting an energy storage module to a respective docking fixture, the energy storage module comprising an electrical power connection coupled to the electrical power module of the respective docking fixture; and
connecting a cooling module to a respective docking fixture, the cooling module comprising a fluid connection coupled to the fluid connection of the respective docking fixture.

10. A method according to claim 9 wherein at least one of the docking fixtures, energy supply module, energy storage module or cooling module further comprises at least one guide pin for facilitating removable connection of the docking fixture and a respective module.

11. A method according to claim 9 further comprising sharing a common fluid between the plurality of docking fixtures, the energy supply module and the cooling module.

12. A method according to claim 9 further comprising providing a crew compartment load.

13. A method according to claim 9 further comprising providing an external power consumption load.

14. A method according to claim 9 wherein the energy supply module comprises a fuel cell.

15. A method of constructing a modular vehicle comprising:
providing a chassis that carries a plurality of docking fixtures, wherein at least one of the docking fixtures comprising an electrical power connection, at least one of the fixtures comprising a fluid connection, and at least one of the fixtures comprising a data communication connection; and
removably connecting a plurality of modules to respective ones of the docking fixtures, wherein the plurality of modules comprise at least an energy supply module and an energy storage module, wherein the energy supply module comprises a fuel cell, wherein the plurality of modules comprise at least one of a crew compartment or a power consumption load, and wherein removably connecting the plurality of modules comprises coupling an electrical power connection of at least one of the modules to the electrical power connection of at least one docking fixture, coupling a fluid connection of at least one of the modules to the fluid connection of at least one docking fixture, and coupling a data communication connection of at least one of the modules to the data communication connection of at least one docking fixture.

16. A method according to claim 15 wherein removably connecting a plurality of modules to respective ones of the docking fixtures further comprises facilitating removable connection of at least one module to a respective docking fixture with at least one guide pin.

17. A method according to claim 15 wherein removably connecting a plurality of modules to respective ones of the docking fixtures further comprises coupling a fluid connection of a cooling module to the fluid connection of a respective docking fixture.

18. A method according to claim 15 further comprising sharing a common fluid between the plurality of docking fixtures and the plurality of modules.

19. A method according to claim 15 further comprising providing for data communication via the respective electrical power connections of the at least one docking fixture and the at least one module.

\* \* \* \* \*